US007795341B2

(12) United States Patent
He et al.

(10) Patent No.: US 7,795,341 B2
(45) Date of Patent: *Sep. 14, 2010

(54) IONOMER-CONTAINING HOT MELT ADHESIVE

(75) Inventors: Qiwei He, Belle Mead, NJ (US); Michael G. Harwell, Hillsborough, NJ (US); Ju-ming Hung, Yardley, PA (US); Kenneth E. Martin, Newark, DE (US); Tahir Iqbal, Waynesboro, VA (US); Sam L. Samuels, Landenberg, PA (US)

(73) Assignee: Henkel AG & Co. KGaA, Duesseldorf (DE)

( * ) Notice: Subject to any disclaimer, the term of this patent is extended or adjusted under 35 U.S.C. 154(b) by 95 days.

This patent is subject to a terminal disclaimer.

(21) Appl. No.: 10/773,547

(22) Filed: Feb. 6, 2004

(65) Prior Publication Data

US 2005/0176868 A1 Aug. 11, 2005

(51) Int. Cl.
*C09D 5/02* (2006.01)
(52) U.S. Cl. .................. 524/505; 524/487; 524/521; 524/522; 524/523
(58) Field of Classification Search ............ 427/2.3, 427/208, 208.2; 524/487, 505, 522, 523, 524/521; 428/500, 515
See application file for complete search history.

(56) References Cited

U.S. PATENT DOCUMENTS

| 3,932,329 A | | 1/1976 | Lakshmanan et al. |
| 4,284,542 A | * | 8/1981 | Boyce et al. ............... 524/140 |
| 4,423,182 A | | 12/1983 | Bartman |
| 4,699,941 A | | 10/1987 | Salerno |
| 5,532,306 A | | 7/1996 | Kauffman et al. |
| 5,719,226 A | | 2/1998 | Kegley |
| 5,723,222 A | | 3/1998 | Sato et al. |
| 5,804,519 A | | 9/1998 | Riswick et al. |
| 5,869,555 A | | 2/1999 | Simmons et al. |
| 5,939,483 A | | 8/1999 | Kueppers |
| 5,942,569 A | | 8/1999 | Simmons et al. |
| 6,103,814 A | | 8/2000 | Van Drongelen et al. |
| 6,117,945 A | * | 9/2000 | Mehaffy et al. ............. 525/159 |
| 6,232,391 B1 | | 5/2001 | Sambasivam et al. |
| 6,541,098 B2 | * | 4/2003 | Venkatasanthanam et al. ........................ 428/161 |
| 2002/0061966 A1 | * | 5/2002 | Tomita et al. ............. 525/92 D |
| 2004/0077240 A1 | | 4/2004 | Paul et al. |
| 2007/0161742 A1 | | 7/2007 | He et al. |

FOREIGN PATENT DOCUMENTS

| WO | WO9815407 | 4/1998 |
| WO | WO0078886 | 12/2000 |

* cited by examiner

*Primary Examiner*—Peter D Mulcahy
(74) *Attorney, Agent, or Firm*—Sun Hee Lehmann

(57) ABSTRACT

Adhesives comprising up to about 40 wt % of an ionomer can be applied at low temperatures and exhibit good bond strength. The adhesives are particularly useful as elastic attachment adhesives.

14 Claims, No Drawings

IONOMER-CONTAINING HOT MELT ADHESIVE

FIELD OF THE INVENTION

The present invention relates to hot melt adhesive compositions, and more particularly to hot melt adhesives containing an ionomer and its use as an elastic attachment adhesive.

BACKGROUND OF THE INVENTION

Hot melt adhesives are widely used for various commercial and industrial applications such as product assembly and packaging. Such hot melt adhesives are applied to a substrate while in its molten state and cooled to harden the adhesive layer.

Most commercially available hot melt adhesives require temperatures of 350° F. or greater to ensure complete melting of all the components and also to achieve a satisfactory application viscosity. The need for such elevated temperatures is not without problems. The high temperatures increase operators risks with respect both to burns and to inhalation of residual volatiles. In addition, the high temperatures require more energy, placing greater demands on the manufacturing facility.

Adhesive formulations, which can be applied at temperatures below 300° F., can be prepared using low polymer/elastomer content or low molecular weight components or a high wax content. Although these formulations achieve a low application viscosity, there is a resulting loss of adhesive properties such as toughness, heat resistance, and sometimes, specific adhesion to a substrate. While the formulation of poly(ethylene-vinylacetate)-based adhesives having high heat resistance has been in addressed in the art, see, e.g., U.S. Pat. No. 6,117,945, lower application temperature (e.g., less than 300° F.) thermoplastic elastomer-based adhesives which provide toughness, strength, and specific adhesion on a desired substrate have not been achieved.

Accordingly it would be desirable to have thermoplastic elastomer-based adhesives that exhibit good bond strength with exceptional toughness, tensile strength and application viscosity, even if prepared with low molecular weight components for application at low temperatures. The current invention addresses this need in the art.

SUMMARY OF THE INVENTION

The invention provides an adhesive that can be formulated for application at lower temperatures, for example at temperatures of from about 200 to about 300° F., yet still provide exceptional toughness. The adhesives of the invention are particularly useful in elastic attachment applications in nonwovens, e.g., as used in the manufacture of baby diapers, training pants and adult incontinence garments.

One aspect of the invention is directed to a hot melt adhesive comprising a thermoplastic elastomer, a tackifying resin and an ionomer resin. In one embodiment the adhesives of the invention comprise, based upon the total weight of the adhesive composition, from about 0.5 to about 55 wt % of a thermoplastic elastomer, from about 30 to about 90 wt % of a tackifying resin, and from about 0.1 to 40 wt % of an ionomer resin. The adhesives of the invention may desirably also comprise up to about 40 wt % of a diluent and up to about 25 wt % of a wax.

Another aspect of the invention is directed to an article of manufacture comprising a hot melt adhesive wherein the adhesive comprises a thermoplastic elastomer, a tackifying resin and an ionomer resin. Articles of manufacture will typically comprise at least one substrate. In one embodiment, the article of manufacture is a diaper comprising such an adhesive. The adhesives find particular use in elastic attachment applications in the manufacture of articles comprising an elastic region, such as is found in disposable absorbent garments comprising one or more elastic cuffs positioned to contact the legs and/or waist of the wearer. In a particularly preferred embodiment, the elastic substrate comprises spandex.

Still another aspect of the invention is directed to a process for bonding a substrate to a similar or dissimilar substrate comprising applying to at least a first substrate a molten hot melt adhesive composition, bringing at least a second substrate in contact with the adhesive present on the first substrate whereby said first and second substrates are bonded together. The adhesive composition used in the process comprises a thermoplastic elastomer, a tackifying resin and an ionomer resin. In a particularly preferred embodiment, at least one substrate is an elastomeric polyurethane fiber (spandex). Another preferred embodiment is directed to a process for bonding a tissue or a nonwoven substrate to a similar or dissimilar substrate in the construction of a disposable absorbent product.

DETAILED DESCRIPTION OF THE INVENTION

All documents cited herein are incorporated in their entireties by reference.

The present invention provides a hot melt adhesive composition. Compositions of the invention may advantageously be formulated for application a low temperatures, i.e., can be applied at temperatures between from about 200 to about 300° F. yet still provide exceptional toughness, heat resistance and specific adhesions. In one embodiment, the adhesive is applied at a temperature above about 250° F., preferably at a temperature of from about 270° F. to about 285° F. In another embodiment, the adhesive can be applied at temperatures of 250° F., down to about 200° F. Hot melt adhesives that can be applied at low temperatures (from about 300° F. down to about 200° F.) are particularly useful as elastic attachment adhesives since many fibers can be stretched further, without breakage, than when using a conventional hot melt adhesive.

One property that is particularly desirable when it is to be used in elastic attachment applications, is creep performance. In such applications, an adhesive with excellent toughness is preferred. The adhesives of the invention have those properties desired for elastic attachment applications, and other applications. The adhesives are thus particularly useful in making elastic non-wovens and in the fabrication of baby diapers, training pants, adult incontinence briefs or undergarments, and the like.

The hot melt adhesives of the invention comprise a thermoplastic elastomer, a tackifying resin an ionomer resin and, if desired, other additives such as diluents, waxes and the like.

The adhesives of the invention typically comprises from about 0.5 to about 55 wt %, preferably from about 5 to about 55 wt %, of at least one thermoplastic elastomer. Polymers that may be used in preparing the thermoplastic elastomer component of the adhesive compositions of the present invention are block copolymers having the general configuration A-B-A wherein the polymer end-blocks A are non-elastomeric polymer blocks which, as homopolymers, have glass transition temperatures above about 20° C., while the elastomeric polymer mid-blocks B are derived from isoprene, butadiene or isobutylene which may be partially or substantially hydrogenated or mixtures thereof. Further, the copolymers may be linear or branched. Typical branched structures contain an elastomeric portion with at least three branches that can radiate out from a central hub or can be otherwise coupled together.

The non-elastomeric end-blocks A may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, and ethyl vinyl benzene as well as dicyclic monovinyl compounds such as vinyl naphthalene and the like. Other non-elastomeric polymer blocks may be derived from alpha olefins, alkylene oxides, acetals, urethanes, etc. Styrene is preferred.

The elastomeric mid-block B component making up the remainder of the thermoplastic elastomeric copolymer is typically derived from isoprene, butadiene or isobutylene which may be hydrogenated as taught, for example, in U.S. Pat. No. 3,700,633. This hydrogenation of butadiene may be either partially or substantially complete. Selected conditions may be employed for example to hydrogenate the elastomeric butadiene block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete. Hydrogenated polymers are preferred to minimize degradation during processing, which is a more severe problem with higher molecular weight polymers.

The adhesives of the invention will typically comprise from about 30 to about 90 wt % of a tackifying resin. Preferred adhesive compositions will comprise from about 40 to about 80 wt %, more preferably from about 40 to about 65 wt % of a tackifying resin which is compatible with the midblock of the thermoplastic elastomer. Preferred are tackifiers having a Ring and Ball softening point above about 25° C. Suitable tackifiers include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 70° to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

Preferred tackifiers for use herein include polyterpenes such as Wingtack 95 from Goodyear; aliphatic resins such as Hercures C from Hercules; cycloaliphatic resins such as Eastotac H100R from Eastman; and aliphatic/aromatic or cycloaliphatic/aromatic resins such as ESCOREZ 5600 from ExxonMobil Chemical Company. More preferred are the aliphatic and cycloaliphatic resins. The desirability and selection of the particular tackifying agent can depend upon the specific elastomeric block copolymer employed.

The adhesives of the invention will comprise up to about 40 wt %, typically from about 0.1 wt % up to about 15 wt %, more typically less than about 10 wt %, even more typically up to about 5 wt % of an ionomer resin or mixture thereof. Useful ionomers are polymers or copolymers of compounds that contain, but are not limited to, carboxylate, sulphonate or phosphonate that is neutralized or partially neutralized by $Na^+$, $Li^+$, $Ca^{++}$, $Mg^{++}$, $Zn^{++}$, $Ba^{++}$ or $Al^{+++}$ or other metallic ions. The percentage of the ionic content in the copolymer can be varied and the percentage of neutralization can also be varied. Ionomers for use in the practice of the invention are commercially available. For example, there are acrylic acid based-ionomers, such as ACLyn® from Honeywell, Surlyn® from DuPont, and Escor® and Iotek® from ExxonMobil, that are copolymers of ethylene and acrylic acid or methacrylic acid neutralized by metallic ions. Also available are butadiene-styrene-acrylic acid terpolymer such as Hycar® from B. F. Goodrich. Useful ionomers include perfluorinated ionomers. Such ionomers are commercially available. Examples include DuPont's Nafion®, and Asahi Glass Company's Flemion®.

Additionally, it may be desirable to incorporate in the adhesive up to about 30 wt % of an end block tackifying resin. End block tackifying resins reside predominantly in the non-elastomer blocks of the thermoplastic elastomer after the adhesive is cooled. Representative of such resins are the primarily aromatic resins based on mixed C9 petroleum distillation streams such as the Hecures materials available from Hercules, or resins based on pure or mixed monomer streams of aromatic monomers such as homo or copolymers of vinyl toluene, styrene, alpha-methyl styrene, coumarone or indene. Preferred are those based on alpha-methyl styrene available from Hercules under the Kristalex trade name. If present, the end block resin is generally used in an amount of from about 5 to about 30 wt %, preferably less than about 20 wt %.

There may also be present in the adhesive up to about 40 wt %, preferably about 5 to about 30 wt %, of an oil or other liquid diluent which is primarily aliphatic in character and is compatible with the thermoplastic elastomer midblock. Examples include plasticizers such as paraffinic and naphthenic petroleum oils, highly refined aromatic-free paraffinic and naphthenic food and technical grade white petroleum mineral oils, and liquid tackifiers such as the synthetic liquid oligomers of polybutene, polypropene, polyterpene, etc. The synthetic series process oils are high viscosity oligomers which are permanently fluid liquid monolefins, isoparaffins or paraffins of moderate to high molecular weight. Liquid plasticizing or tackifying diluents include polyterpenes such as Wingtack 10 available from Goodyear, and Escorez 2520 based on a $C_5$ feed stream available from Exxon Chemical. Other liquid diluents include polyisoprene, available as LIR 50 from Kuraray, and Amoco's polybutenes available under the name Indopol. Most preferred are paraffinic oils in combination with Escorez 2520, a polymerized $C_5$ petroleum feed stream.

Also, optionally, there may be present up to about 25 wt %, preferably up to about 5 wt %, of a wax. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, including vinyl acetate modified waxes such as AC-400 (Honeywell) and MC-400 (available from Marcus Oil Company), maleic anhydride modified waxes such as Epolene C-18 (available from Eastman Chemical) and AC-575A and AC-575P (available from Honeywell) and oxidized waxes may be used in the practice of the invention. Particulalry preferred are polyethylene waxes. If used, the wax is generally present in an amount of at least about 2 wt %.

Finally, antioxidants typically used in the production of rubber based pressure sensitive adhesives may be present in an amount of up to about 3 wt %. Among the useful stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. Representative hindered phenols include: 1,3,5-trimethyl 2,4, 6-tris (3,5-di-tert-butyl-4-hydroxybenzyl) benzene; pentaerythrityl tetrakis-3(3,5-di-tert-butyl4-hydroxyphenyl)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octylthio)-1,2,5-triazine; di-n-octadecyl3,5-di-tert-butyl-4-hydroxybenzyl phosphonate; 2-(n-octylthio)ethyl 3,5-di-tert-butyl-4-hydroxybenzoate; and sorbitol hexa[3-(3,5-di-tert-butyl-4-hydroxyphenyl)-propionate].

The hot melt adhesives may be prepared using techniques known in the art. Typically, the adhesive compositions are prepared by blending the components in the melt at a temperature of about 100° to 200° C. until a homogeneous blend is obtained. Various methods of blending are known and any method that produces a homogeneous blend is satisfactory.

A preferred adhesive composition comprises (a) from about 5 to about 35 wt % of a thermoplastic elastomer such as styrene-isoprene-styrene (SIS), styrene-butadiene-styrene (SBS), styrene-isobutylene styrene (SIBS), styrene-b-ethylene/butylene-b-styrene (SEBS), and/or styrene-b-ethylene/propylene-b-styrene (SEPS), or radial copolymer $(SI)_n$, and/or $(SB)_n$, wherein n is equal or larger than 3, (b) from about 40 to about 70 wt % of a tackifying resin which is compatible with the mid-block of the block-copolymer listed in (a), (c) from about 5 to about 30 wt percent of a thermoplastic hydrocarbon tackifier which is compatible with the end-block of the block-copolymer listed in (a), (d) from about 0.1 to about 15 wt percent of an ionomer resin, (e) from 0 to about 30 wt % of a diluent such as mineral oil and (f) from 0 to about 5 wt % wax.

The adhesive may be applied to a desired substrate by any method known in the art, and include, without limitation roll coating, painting, dry-brushing, dip coating, spraying, slot-coating, swirl spraying, printing (e.g., ink jet printing), flexographic, extrusion, atomized spraying, gravure (pattern wheel transfer), electrostatic, vapor deposition, fiberization and/or screen printing.

The adhesive of the invention are useful as positioning adhesives, core adhesives or elastic adhesives, and are particularly suitable for use in the manufacture of articles, including but not limited to disposable absorbent articles, such as diapers, adult incontinent products, bed pads; sanitary napkins, and in other absorbent products, such as, bibs, wound dressings, and surgical capes or drapes, which are used to absorb a liquid, such as water and saline, and body liquids, such as urine, menses, and blood. The adhesive may be used to adhere a nonwoven or tissue to another substrate or component. The second substrate may be another nonwoven, tissue, or an unrelated material.

The present invention provides an absorbent article comprising a liquid permeable topsheet, a liquid impermeable back sheet and an absorbent member interposed between the topsheet and the back sheet. Typically, the back sheet will be a composite sheet comprising a liquid impermeable sheet and a nonwoven fabric joined to each other by an adhesive. The invention encompasses composites and disposable absorbent products made with or with out one or more elastomeric strands or ribbons.

As an absorbent structure or product is made, it generally undergoes a number of different steps in which components or pieces are connected to one another. For example, portions of the topsheet and backsheet typically are bonded together. Also, to the extent the absorbent structure or product incorporates elastomeric regions such as elasticized waistbands or elasticized leg bands or leg cuffs, elastic strands or elastic ribbons are typically bonded to a portion of one or more base materials, substrates, or webs.

"Bonded" or "attached" refers to the joining, adhering, connecting, or the like, of two elements. Two elements are considered bonded together when they are bonded directly to one another or indirectly to one another (e.g., as when each element is directly bonded to an intermediate element).

Piece" or "component," as used herein, means a discrete part, a web, or some other element used to help build a composite or an absorbent product. Examples of such discrete parts or webs are discussed below.

"Elastic strand," as used herein, comprises polymeric constituents such as, but not limited to: polyetherester; polyurethane; polyamide; polyacrylate; or combinations thereof, including random, block, or graft copolymers such as polyester-b-polyurethane block copolymers, polyether-b-polyurethane block copolymers, styrenic block copolymers, and/or polyether-b-polyamide block copolymers. Examples of elastic strand include LYCRA, a multifilament elastomeric thread sold by Invista, Inc., and GLOSPAN, an elastic strand made by Globe Manufacturing Company.

For those composites comprising an elastic strand, elastic ribbon, or other elastomeric material, "creep-resistance" or "creep-resistance value" refers to the elastic-strand holding power of a particular system for attaching one or more elastic materials to at least one piece. For example, if an adhesive is applied in liquid form to a first piece, and an elastic strand or strands are then pressed against the adhesive and first piece to attach the strand or strands to the first piece, then creep resistance is a measure of the quality of the adhesive bond between the strand or strands and the first piece. Generally the elastic strand or strands will be sandwiched between a first piece and a second piece, or will be enclosed by folding a piece over the strands.

The term "nonwoven" or "nonwoven web" refers to a web of material that is formed without the aid of a textile weaving or knitting process. The term "fabrics" is used to refer to all of the woven, knitted, and nonwoven fibrous webs.

Fibers constituting the nonwoven fabric will typically have a linear density of 1.5 to 3.5 denier. The fibers constituting the nonwoven fabric are not particularly limited in form or material as far as the fiber diameter falls within the above range. Either long continuous filaments or staple fibers may be used. The individual fibers used to compose the nonwoven fabric may be synthetic, naturally occurring, or a combination of the two. The fibers include thermoplastic synthetic fibers, such as polyethylene fibers, polypropylene fibers, polyester fibers and polyamide fibers; natural fibers, such as cotton, hemp and wool; and regenerated fibers, such as rayon fibers and acetate fibers. The individual fibers may be mechanically, chemically, or thermally bonded to each other. Nonwoven fabrics will typically have a basis weight of 10 to 35 $g/m^2$. Nonwovens are used commercially for a variety of applications including insulation, packaging (e.g., foods such as meat), household wipes, surgical drapes, medical dressings, and in disposable articles such as diapers, adult incontinent products and sanitary napkins. Tissue is a closely related material in which the individual fibers may or may not be chemically bonded to one another.

A "liquid-permeable topsheet" generally comprises a nonwoven web; a spunbond, meltblown, or bonded-carded web composed of synthetic polymer filaments or fibers, such as polypropylene, polyethylene, polyesters or the like; a perforated film; or a web of natural polymer filaments or fibers such as rayon or cotton.

A "liquid-impermeable backsheet" generally comprises moisture-barrier materials such as films, wovens, nonwovens, laminates of films, or the like. For example, the backsheet may comprise a substantially liquid-impermeable web or sheet of plastic film such as polyethylene, polypropylene, polyvinyl chloride, or similar material. The backsheet functions to contain liquids, such as water, urine, menses, or blood, within the absorbent core of the disposable absorbent product and to protect bedding and/or a wears' outer garments from soiling. Materials useful as a backsheet in a disposable absorbent product are generally impermeable to liquid but preferably are permeable to vapor. Examples are liquid-impervious materials such as polyolefin films, e.g., polypropylene and polyethylene, as well as vapor-pervious materials, such as microporous polyolefin films, sometimes referred to as breathable films.

As noted above, some disposable absorbent articles are constructed with various types of elasticized waistbands and elasticized leg bands or leg cuffs. One method of constructing elasticized regions is to incorporate elastic strands into a laminate that is then attached to a part of the disposable absorbent product as it is built. For example, elastic strands have been laminated between layers of polymer film and/or layers of woven or nonwoven fabrics to provide the absorbent product with elastomeric regions. Folded-over layers have also been employed to enclose or envelop selected strands of material. These folded-over layers have been employed to enclose elastomeric strands within the waistband, leg cuff and inner barrier cuff components of disposable diapers and other disposable absorbent articles. The polymeric film or films, layers of woven or nonwoven fabrics, and/or folded-over layers may be an integral portion of the topsheet and/or backsheet discussed above, or may be separate components that are attached to the topsheet and/or backsheet.

In order to introduce an elastic strand to the product being made, a spool of the strand is generally placed on an unwind stand. The strand is then continuously unwound, in the machine direction, with the strand being attached to a substrate, such as a base layer of material, to provide a composite. For purposes of this application, "piece" or "component" encompasses webs such as the aforementioned substrates or base layers of materials. As stated above, examples of a base material include, but are not limited to, polymeric films and/or woven or nonwoven fabrics. Also, as stated above, the elastic strand is typically sandwiched between two different layers of base material, or between a folded-over portion of base material, to form a composite. In the practice of the invention, the strand is advantageously attached to the base material, or materials, using the adhesive of the invention To produce an elasticized region, the strand is stretched when it is attached to a base material to form a substrate composite. The stretched elastic strands tend to retract and gather the composite, thereby imparting elastomeric properties to the composite. As mentioned above, the composite may be formed to provide an elasticized waistband or leg band in a disposable absorbent product.

The adhesive of the invention may be used to attach the topsheet to the backsheet. Alternatively, the adhesive may be used to adhere either the topsheet or the backsheet to other components of the disposable absorbent product, such as tissue layers, leg flaps, fastening ears, tapes, or tabs, or other components typically used to construct a disposable absorbent product that are well known to one skilled in the art.

The adhesive of the invention is particularly useful as an elastic attachment adhesive. Materials with excellent stretchability and elasticity are needed to manufacture a variety of disposal and durable articles such as, for example, incontinence pads, disposable diapers, training pants, clothing, undergarments, sports apparel, automotive trim, weather-stripping, gaskets, and furniture upholstery. Stretchability and elasticity are performance attributes that can, for example, function to effectuate a closely conforming fit to the body of a wearer or to the frame of an item. While numerous materials are known to exhibit excellent stress-strain properties and elasticity at room temperatures, it is often desirable for elastic materials to provide a conforming or secure fit during repeated use, extensions and retractions at elevated temperatures such as at body temperatures or in automobile interiors during summer months. The adhesives find particular use as elastic attachment adhesive for use in non-woven applications such as baby diaper or adult incontinence items. In addition to the non-woven markets, the hot melt adhesives of the invention are useful in the packaging, converting and bookbinding markets where the desire is to reduce application temperature and, at the same time, keep the toughness and strength of the adhesive.

Disposable elastic articles are typically composite materials prepared from polymer films, elastomeric fibers, nonwoven sheets and/or absorbent materials by a combination of fabrication technologies. Elastomeric fibers can be prepared by well known processes such as melt- and solution-spinning and optionally winding. Nonwoven sheets can be prepared by spun bonding, melt blowing, hydroentangling, mechanical entangling and the like. Film and sheet forming processes typically involve known extrusion and coextrusion techniques, e.g., blown film, cast film, profile extrusion, injection molding, extrusion coating, and extrusion sheeting. Polymer films are preferably liquid-impervious materials such as polyolefin films, e.g., polypropylene and polyethylene, as well as vapor-pervious materials, such as microporous polyolefin films, sometimes referred to as breathable films.

Durable elastic articles such as, for example, automotive door and window trim, clothing waist-band threads or strips, and building weather-stripping can be made by well-known molding, thermoforming and profile extrusion technologies.

A material is typically considered elastomeric when it is characterized as having a high percent elastic recovery (i.e., a low percent permanent set) after application of a biasing force. Ideally, elastic materials are characterized by a combination of three, temperature independent properties, i.e., a low percent permanent set, a low stress or load at strain, and a low percent stress or load relaxation. That is, there should be at low to elevated service temperatures (1) a low stress or load requirement to stretch the material, (2) no or low relaxing of the stress or unloading while the material is stretched, and (3) complete or high recovery to original dimensions after the stretching, biasing or straining is discontinued. Thus, an elastomeric polymer is typically a polymer which, free of diluents, has a break elongation in excess of 100% independent of any crimp (when in fiber form) and which when stretched to twice its length, held for one minute, and then released, retracts to less than 1.5 times its original length within one minute of being released.

Polymers with elastomeric properties include, but are not limited to, natural rubber or synthetic rubbers, segmented polyurethanes (including polyurethaneureas) such as polyetherurethanes and polyesterurethanes, polyetheresters, such as for example, Hytrel® from Du Pont, elastomeric polyolefins such as for example elastomeric polypropylene and elastomeric polyethylene for example XLA fibers from Dow, and elastomeric polyamides such as polyetheramides, polyetheresteramides, and polyetheramides for example Pebax® from Atofina. The article of the invention can comprise substrates containing such elastomeric polymers in various forms, and such substrates can be used in the process of the invention.

The adhesives of the invention are particularly useful in the manufacture of articles that comprise the adhesive and at least one elastomeric substrate such as at least one elastomeric fiber, tape, film, strip, coating, ribbon and/or sheet, for example, spandex (e.g., Lycra® spandex and Lycra® XA, a spandex having little or no lubricating finish thereon). In one embodiment, the substrate comprises spandex or melt spun elastomers. In another embodiment the substrate comprises natural or synthetic rubbers in the form of fibers or in the form of strips less than about 10 mm wide. The adhesive and at least one elastomeric substrate may comprise at least one component of an article of manufacture. Non-limiting examples of such components include waistbands, leg bands, bellybands, etc.

The U.S. International Trade Commission defines spandex as a manufactured fiber in which the fiber-forming substance is a long-chain synthetic polymer comprised of at least 85 percent by weight of a segmented polyurethane. Lycra® spandex is known to exhibit nearly ideal, temperature independent elastic properties rendering it very suitable for use in garments, sports apparel and swimsuits.

The invention is further illustrated by the following non-limiting examples.

EXAMPLES

In the following examples, all parts are by weight and all temperatures in degrees Fahrenheit unless otherwise noted.

Adhesive preparation. All the formulations described herein were prepared in a 600 g Brabender mixer with sigma blades. The thermoplastic elastomers and about 20% of the oil in the formulation were added to the bowl preheated to about 325° F. Once homogenous, the ionomer was added. One homogeneous, mid-block tackifier was added. Finally additional oil and the end block tackifier were added. The blending process ended when the mixture was homogeneous.

The following materials were used to prepare a series of adhesives in accordance with the present invention:

Vector 4211, a tri-block copolymer of styrene and isoprene with isoprene as soft mid-block, is a product from ExxonMobil Chemical Company. It has around 30% styrene and has melt flow index around 10-16.

Vector 4411, a tri-block copolymer of styrene and isoprene with isoprene as soft mid-block, is a product from ExxonMobil Chemical Company. It has around 44% styrene and has melt flow index around 30-50.

Vector DPX 552, a radial copolymer of styrene and isoprene with styrene at the end of each arm of the radial, is a product from ExxonMobil Chemical Company. It has around 30% styrene, 24% styrene-isoprene diblock, and has melt flow index around 8-14.

Stereon 842A is butadiene-styrene multi-block copolymers obtained from Firestone Polymer. It has about 44% styrene with melt flow index of 8-15.

Eastotac H100R is a hydrogenated hydrocarbon tackifying resin which has a Ring and Ball softening point of 95° C. to 105° C. and is available from Eastman Chemical Company.

Kristalex® 3085, 3100, and 5140 are aromatic hydrocarbon resins which have Ring and Ball softening points of 82° C. to 88° C., 97° C. to 103° C., and 137° C. to 143° C., respectively. These are all available from Eastman Chemical Company.

Ionomers used included Surlyn 9970, Surlyn 8670 and Surlyn 8660. These ionomers are ethylene-acrylic acid copolymer-based and are available from E.I. duPont de Nemours and Company. The acid content and percentage of neutralization are different varied for each ionomer. Surlyn 8670 and Surlyn 8660 are neutralized by $Na^+$, whereas Surlyn 9970 is neutralized by $Zn^{++}$.

White mineral oil Kaydol USP was also used in the formulation. This oil is available from Crompton Corporation.

The antioxidant chosen was IRGANOX 1010FF, available from Ciba-Geigy.

The non-woven substrate used in the examples was a 16.5 $g/m^2$ spunbonded polypropylene manufactured by Avgol.

The polyethylene film used in the examples was a corona treated TXEM-244.0 embossed film with thickness of 0.75 mil. The film is made by Pliant Corp.

The adhesive samples were subjected to the test described below.

Melt viscosities of the hot melt adhesives were determined on a Brookfield Model RVT Thermosel viscometer using a number 27 spindle.

Tensile performance of the hot melt adhesives was determined on 0. 125" thick, 2.5" long dogbone shaped portions with 1"×1" end tabs and a 0.5"×0.5" central gage portion. These were pulled on an Instron with pneumatic grips at a speed of 12"/min. The breaking stress and the energy per volume of the adhesive were then recorded.

Mechanical Dynamic Performance of the hot melt adhesive was determined by a Rheometrics Dynamic Mechanical Analyzer (Model RDA 700) to obtain the elastic (G') and loss (G") moduli versus temperature. The instrument was controlled by Rhios software version 4.3.2. Parallel plates 8 mm in diameter and separated by a gap of about 2 mm were used. The sample was loaded and then cooled to about −100° C., and the time program started. The program test increased the temperature at 5° C. intervals followed by a soak time at each temperature of 10 seconds. The convection oven containing the sample was flushed continuously with nitrogen. The frequency was maintained at 10 rad/s. The initial strain at the start of the test was 0.05% (at the outer edge of the plates). An autostrain option in the software was used to maintain an accurately measurable torque throughout the test. The option was configured such that the maximum applied strain allowed by the software was 80%. The autostrain program adjusted the strain at each temperature increment if warranted using the following procedure. If the torque was below 200 g-cm the strain was increased by 25% of the current value. If the torque was above 1200 g-cm it was decreased by 25% of the current value. At torques between 200 and 1200 g-cm no change in strain was made at that temperature increment. The shear storage or elastic modulus (G') and the shear loss modulus (G") were calculated by the software from the torque and strain data. Their ratio, G"/G', also known as the tan delta, was also calculated. The mid-block Tg was taken as the maximum in tan delta.

Creep Performance was evaluated by measuring how much a free-end elastic strand retracts under the stretched condition at end-use temperature (100° F) during a 4-hour period.

The length of a filament (spandex) adhered in the stretched condition between two nonwoven sheets or a nonwoven sheet and a polymeric film was measured ("starting length"). Both ends of the spandex were cut and the amount that the resulting free-end filament retracts was measured following a 4 hour period at 100° F. The percent creep was then calculated in the following manner:

$$\% \text{ creep} = \frac{\text{starting length} - \text{final length}}{\text{starting length}} \times 100$$

For example, if the initial distance between marks was 20 cm and the final distance between the marks was 15 cm, the percent creep is 25%. Five samples for each condition were tested and the results averaged for each elastic strand and result recorded.

Example 1

The following formulations and their properties show that the addition of ionomer can reduce the melt viscosity of adhesive, and improve the toughness and the ultimate stress at break of adhesive at same time. Four adhesive formulations were made and the mechanical properties measured and compared.

Table 1 shows formulations with 2% addition of different ionomers. These formulations also contained 0.5 wt % of Irganox® 1010.

TABLE 1

|  | Comparative Sample | Sample A1 | Sample A2 | Sample A3 |
|---|---|---|---|---|
| Surlyn (wt %) | 0 | 2.0 (Surlyn 9970) | 2.0 (Surlyn 8660) | 2.0 (Surlyn 8670) |
| Vector 4211 (wt %) | 21.0 | 19.0 | 19.0 | 19.0 |
| Kristalex 3085(wt %) | 6.0 | 6.0 | 6.0 | 6.0 |
| Eastotac H-100R (wt %) | 58.0 | 58.0 | 58.0 | 58.0 |
| Kaydol Oil (wt %) | 15.0 | 15.0 | 15.0 | 15.0 |

The melt viscosity, the toughness (which was measured as the total energy absorbed to rupture a tensile specimen), the strength (which was measured as the ultimate stress at break in the tensile test), the ultimate strain in the tensile test, and the G"/G' for the formulations in Table 1 are listed in Table 2. These results show that addition of ionomer leads to a viscosity reduction and mechanical strength improvement over the formulation not containing ionomer.

TABLE 2

|  | Comparative Sample | Sample A1 | Sample A2 | Sample A3 |
|---|---|---|---|---|
| Viscosity at 275° F. (cp) | 10500 | 9000 | 8500 | 8500 |
| Toughness (J/cm³) | 4.48 | 6.81 | 5.60 | 5.60 |
| Ultimate stress (psi) | 132.8 | 171.0 | 148.9 | 152.8 |
| Ultimate Strain (%) | 1405 | 1603 | 1538 | 1484 |
| Mid-Block Tg (° C.) | 19.3 | 21.6 | 21.4 | 21.5 |
| G"/G' at 40° C. | 0.663 | 0.960 | 0.949 | 0.980 |

As indicated in Table 2, compared to the base formulation of the comparative sample, the addition of ionomers into the base formulation resulted in the reduction in melt viscosity at 275° F. and increase in toughness, ultimate breaking stress, ultimate strain, and G"/G'.

Example 2

The following example shows the performance improvement of an ionomer-containing adhesive used to attach an elastomeric fiber to a nonwoven substrate. The three formulations listed in Table 3, each with 0.5 wt % Irganox® 1010 added, contained different levels of Surlyn 8670.

TABLE 3

|  | Comparative Sample | Sample B1 | Sample B2 |
|---|---|---|---|
| Surlyn 8670 (wt %) | 0 | 3.0 | 4.5 |
| Vector 4211(wt %) | 21.0 | 18.0 | 16.5 |
| Kristalex 3085(wt %) | 6.0 | 6.0 | 6.0 |
| Eastotac H-100R (wt %) | 58.0 | 58.0 | 58.0 |
| Kaydol Oil (wt %) | 15.0 | 15.0 | 15.0 |

The mechanical properties of these formulations are listed in Table 4. Also listed in Table 4 is the creep performance of the non-woven/elastomeric fiber/non-woven bond. The fiber used in this example was 620 decitex Lycra® XA® spandex. The draft of the fiber was 4.5× while it was being adhered to the nonwoven. The adhesive was sprayed on the nonwoven substrate and spandex with an unwrapped spiral pattern, that is, with the spandex in contact with the nonwoven during application of the adhesive, so that the adhesive did not 'wrap' around to the underside of the spandex, in an intermittent mode using high speed laminator at 300 fpm with 0.1 sec open time and a Nordson 0.018" spiral applicator. The adhesive add-on level was 8 mg/in with three elastic fibers being attached to the non-woven substrate. The adhesive was applied at temperature of 275° F.

TABLE 4

| Performance properties | Comparative Sample | Sample B1 | Sample B2 |
|---|---|---|---|
| Toughness (J/cm³) | 4.48 | 7.02 | 6.81 |
| Ultimate breaking stress (psi) | 132.8 | 171.9 | 157.1 |
| G"/G' at 40° C. | 0.663 | 1.253 | 1.610 |
| Creep performance (%) | 17.3 | 14.3 | 12.5 |

The performance improvement of ionomer-containing adhesive can be seen in the data set forth in Table 4, which shows that the addition of Surlyn to the formulations described in Table 3 provides a significant improvement in creep performance of non-woven/elastomeric fiber/non-woven bond.

Example 3

This example shows that the performance improvement of ionomer-containing adhesive comes from several aspects that relate to adhesive performance. Adhesive formulations are shown in Table 5. Each formulation also contained 0.5 wt % Irganox® 1010.

TABLE 5

|  | Comparative Sample | Sample C1 | Sample C2 | Sample C3 |
|---|---|---|---|---|
| ionomer (wt %) | none (0) | Surlyn 8670 (3.4) | Surlyn 8660 (3.4) | Surlyn 9970 (2.0) |
| Vector 4211 (wt %) | 17.0 | 13.6 | 13.6 | 16.0 |
| Krestalex 3085 (wt %) | 8.5 | 8.5 | 8.5 | 8.2 |
| Eastotac H-100R (wt %) | 59.2 | 59.2 | 59.2 | 57.6 |
| Kaydol Oil (wt %) | 15.3 | 15.3 | 15.3 | 16.2 |

Various properties of formulations listed in Table 5 and the creep performance (tested between two nonwoven sheets (NW/NW) and between a nonwoven sheet and a polymeric film(NW/Poly)) when they were used as an elastic attachment adhesive with add-on of 2.5 mg/in for three elastic strands is shown in Table 6. The fiber used in this example was 620 decitex Lycra® XA® spandex. The draft of the fiber was 4.0× while it was being adhered to the nonwoven. The adhesive was applied on the nonwoven substrate and spandex with a strand coating pattern in a continuous mode using a high speed laminator at 300 fpm and an open time of 0.1 sec and an ITW omega applicator. The adhesive was applied at a temperature of 275° F.

TABLE 6

|  | Comparative Sample | Sample C1 | Sample C2 | Sample C3 |
|---|---|---|---|---|
| Toughness (J/cm³) | 4.34 | 5.00 | 4.71 | 4.60 |
| Ultimate Stress (Psi) | 116.0 | 112.4 | 109.0 | 120.3 |
| G"/G' at 100° F. | 1.97 | 2.97 | 3.01 | 1.77 |
| Viscosity at 275° F. (cp) | 4000 | 5000 | 4000 | 4500 |
| NW/NW Creep Performance (%) | 23.3 | 9.2 | 10.8 | 9.0 |
| NW/Poly Creep Performance (%) | 15.2 | 10.2 | 11.3 | 8.5 |

Improved performance of the ionomer containing adhesive can be seen from the data set forth in Table 6.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. A low application temperature hot melt adhesive comprising from about 5 to about 55 wt % of a thermoplastic elastomer, from about 30 to about 90 wt % of a tackifying resin and from about 0.1 to about 5 wt % of an ionomer resin, and wherein the thermoplastic elastomer has a melt flow index greater than about 8 g/10 min at 200° C./5.0 kg.

2. The adhesive of claim 1 further comprising up to about 40 wt % of a diluent and/or up to about 25 wt % of a wax.

3. The adhesive of claim 1 wherein the thermoplastic elastomer is styrene-isoprene-styrene, styrene-b-ethylene/butylene-b-styrene, styrene-butadiene-styrene or a mixture thereof.

4. The adhesive of claim 1, wherein the ionomer resin is selected from the group consisting of polymers and copolymers comprising moieties selected from the group consisting of carboxylate, sulphonate and phosphonate, which moieties are at least partly neutralized by metallic ions selected from the group consisting of $Na^+$, $Li^+$, $Ca^{++}$, $Mg^{++}$, $Zn^{++}$, $Ba^{++}$ and $Al^{+++}$.

5. The adhesive of claim 1 which can be applied at a temperature of from 270° F. to about 285° F.

6. The adhesive of claim 1 which can be applied at a temperature of from about 200° F. to 250° F.

7. An adhesive comprising
   (a) from about 5 to about 35 wt % of a thermoplastic elastomer selected from the group consisting of styrene-isoprene-styrene (SIS), styrene-butadiene-styrene (SBS), styrene-isobutylene styrene (SIBS), styrene-b-ethylene/butylene-b-styrene (SEBS), styrene-b-ethylene/propylene-b-styrene (SEPS), radial copolymer $(SI)_n$ wherein n is equal or larger than 3, $(SB)_n$ wherein n is equal or larger than 3, and mixtures thereof, and wherein the thermoplastic elastomer has a melt flow index greater than about 8 g/10 min at 200° C./5.0 kg,
   (b) from about 40 to about 70 wt % of a tackifying resin which is compatible with the mid-block of the block-copolymer (a),
   (c) from about 5 to about 30 wt percent of a thermoplastic hydrocarbon tackifier which is compatible with the end-block of the block-copolymer listed in (a), and
   (d) from about 0.1 to about 15 wt percent of an ionomer resin.

8. The adhesive of claim 7 wherein said ionomer resin is present in an amount from about 0.1 to about 5 wt %.

9. The adhesive of claim 7 further comprising a diluent and/or a wax, which diluent is present in amounts of up to about 30 wt % and which wax is present in amounts of up to about 5 wt %.

10. The adhesive of claim 7, wherein the ionomer resin is selected from the group consisting of polymers and copolymers comprising moieties selected from the group consisting of carboxylate, sulphonate and phosphonate, which moieties are at least partly neutralized by metallic ions selected from the group consisting of $Na^+$, $Li^+$, $Ca^{++}$, $Mg^{++}$, $Zn^{++}$, $Ba^{++}$ and $Al^{+++}$.

11. A hot melt adhesive consisting of from about 0.5 to about 55 wt % of a thermoplastic elastomer, from about 30 to about 90 wt % of a tackifying resin, from about 0.1 to 40 wt % of an ionomer resin, 0 to about 40 wt % of a liquid diluent, 0 to about 25 wt % of a wax and 0 to about 3 wt % of an antioxidant, and wherein the thermoplastic elastomer has a melt flow index greater than about 8 g/10 min at 200° C./5.0 kg.

12. The adhesive of claim 11 consisting of
   (a) from about 5 to about 35 wt % of a thermoplastic elastomer selected from the group consisting of styreneisoprene-styrene (SIS), styrene-butadiene-styrene (SBS), styrene-isobutylene styrene (SIBS), styrene-b-ethylene/butylene-b-styrene (SEBS), styrene-b-ethylene/propylene-b-styrene (SEPS), radial copolymer $(SI)_n$ wherein n is equal or larger than 3, $(SB)_n$ wherein n is equal or larger than 3, and mixtures thereof, (b) from about 40 to about 70 wt % of a tackifying resin which is compatible with the mid-block of the block-copolymer (a), (c) from about 5 to about 30 wt percent of a thermoplastic hydrocarbon tackifier which is compatible with the end-block of the block-copolymer listed in (a), (d) from about 0.1 to about 15 wt percent of an ionomer resin, (e) from 0 to about 30 wt % of a liquid diluent, (f) from 0 to about 5 wt % of a wax, and (g) from 0 to 3 wt % of an antioxidant.

13. The adhesive of claim 11 wherein said ionomer resin is present in an amount from about 0.1 to about 5 wt %.

14. The adhesive of claim 13 wherein said ionomer resin is selected from the group consisting of polymers and copolymers comprising moieties selected from the group consisting of carboxylate, sulphonate and phosphonate, which moieties are at least partly neutralized by metallic ions selected from the group consisting of $Na^+$, $Li^+$, $Ca^{++}$, $Mg^{++}$, $Zn^{++}$, $Ba^{++}$ and $Al^{+++}$.

* * * * *